United States Patent [19]
Visser

[11] Patent Number: 6,023,536
[45] Date of Patent: Feb. 8, 2000

[54] CHARACTER STRING CORRECTION SYSTEM AND METHOD USING ERROR PATTERN

[75] Inventor: Eric M. Visser, Kawasaki, Japan

[73] Assignee: Fujitsu Limited, Kawasaki, Japan

[21] Appl. No.: 08/668,222

[22] Filed: Jun. 21, 1996

[30] Foreign Application Priority Data

Jul. 3, 1995 [JP] Japan ................................. 7-167676

[51] Int. Cl.[7] .................................................. G06K 9/72
[52] U.S. Cl. .......................... 382/310; 382/229; 707/532
[58] Field of Search .................................. 382/229, 231, 382/310, 311, 309, 185–187, 177; 395/793–796; 707/532, 533, 534

[56] References Cited

U.S. PATENT DOCUMENTS

| Re. 35,738 | 2/1998 | Woo, Jr. et al. | 382/311 |
|---|---|---|---|
| 4,328,561 | 5/1982 | Convis et al. | 382/310 |
| 4,979,227 | 12/1990 | Mittelbach et al. | 382/310 |
| 5,161,245 | 11/1992 | French | 382/310 |
| 5,315,671 | 5/1994 | Higuchi | 382/309 |

OTHER PUBLICATIONS

Simpson, A. "Mastering WordPerfect 5.1 & 5.2 for Windows", pp. 362–365, 1993.

Novell, Inc. "WordPerfect 6.1 User's Guide" p. 468, screen capture, 1994.

*Primary Examiner*—Amelia Au
*Assistant Examiner*—Larry J. Prikockis
*Attorney, Agent, or Firm*—Staas & Halsey LLP

[57] ABSTRACT

A character string correction system corrects a spelling error in a character string input through the keyboard, OCT, etc. An error pattern representing frequent occurrences of errors is preliminarily set and stored in the memory, etc. A processor reads an input character string character by character, and compares the read character with the error pattern. If the input character string matches an error pattern, it is assumed that an error exists. The input character is replaced with one of the alternative characters. Using the input character string or the character string corrected with an alternative character, a dictionary (TRIE table) is searched. If a corresponding word is detected in the dictionary, the word is output as one of the recognition results.

10 Claims, 21 Drawing Sheets

FIG. 1A
(PRIOR ART)

TRIE TABLE "root"

| INPUT CHARACTER | DICTIONARY WORD | TRIE TABLE LINK |
|---|---|---|
| a | Art | a- |
| b | 0 | b- |
| c | 0 | c- |
| ⋮ | ⋮ | ⋮ |
| r | 0 | r- |
| ⋮ | ⋮ | ⋮ |
| x | 0 | x- |
| y | 0 | y- |
| z | 0 | z- |

FIG. 1B
(PRIOR ART)

TRIE TABLE "r-"

| INPUT CHARACTER | DICTIONARY WORD | TRIE TABLE LINK |
|---|---|---|
| a | N, Prop.N | ra- |
| b | N | rb- |
| d | 0 | rd- |
| e | Prep | re- |
| h | 0 | rh- |
| i | 0 | ri- |
| o | 0 | ro- |
| t | 0 | rt- |
| u | 0 | ru- |
| y | 0 | ry- |

FIG. 1C
(PRIOR ART)

TRIE TABLE "rd-"

| INPUT CHARACTER | DICTIONARY WORD | TRIE TABLE LINK |
|---|---|---|
| . | N | rd.- |

FIG. 1D
(PRIOR ART)

TRIE TABLE "rd.-"

| INPUT CHARACTER | DICTIONARY WORD | TRIE TABLE LINK |
|---|---|---|

FIG. 5

[0]  ( (fault pattern) $\Longrightarrow$ (correct pattern) || (conditions) || (weight) )

[1]  ( (x y) $\Longrightarrow$ (y x) || ((x $\neq$ y)) || (0.6) )

[2]  ( (x) $\Longrightarrow$ (y) || ((x $\neq$ y)) || (0.4) )

[3]  ( (/t /o /i /s) $\Longrightarrow$ (/t /i /o /n /s) || $\emptyset$ || (0.2) )

[4]  ( (x x) $\Longrightarrow$ (x) || $\emptyset$ || (0.3) )

[5]  ( (x) $\Longrightarrow$ (y x) || ((x = y) (x $\neq$ y)) || (0.3) )

FIG. 6A $$\text{PATH} = \left( \left( \begin{array}{c} \text{CURRENT TRIE TABLE} \\ \text{LAST-READ CHARACTER} \\ \text{SUBSTITUTED CHARACTER OR CHARACTERS} \\ \text{ERROR PATTERN IN PROGRESS} \\ \text{ERROR STATISTICS SO FAR} \\ \text{INPUT POINTER POSITION} \end{array} \right) \left( \begin{array}{c} \cdots \\ \cdots \\ \cdots \\ \cdots \\ \cdots \\ \cdots \end{array} \right) \cdots \right)$$

⇑
1 STEP

FIG. 6B $$\text{ROOT PATH} = \left( \left( \begin{array}{c} \text{"root"} \\ \emptyset \\ \emptyset \\ \emptyset \\ \emptyset \\ 0 \end{array} \right) \right)$$

FIG. 6C

PATH FOR 'cat' (MISSPELLED 'cta') =

$$\left( \underbrace{\left( \begin{array}{c} \text{"root"} \\ \emptyset \\ \emptyset \\ \emptyset \\ \emptyset \\ 0 \end{array} \right)}_{ST1} \underbrace{\left( \begin{array}{c} \text{"c-"} \\ c \\ c \\ \emptyset \\ \emptyset \\ 1 \end{array} \right)}_{ST2} \underbrace{\left( \begin{array}{c} \text{"ca-"} \\ t \\ a \\ ((/a) \Rightarrow (/t) \parallel \emptyset) \\ \text{1 error, weight 0.6} \\ 2 \end{array} \right)}_{ST3} \underbrace{\left( \begin{array}{c} \text{"cat-"} \\ a \\ t \\ \emptyset \\ \text{1 error, weight 0.6} \\ 3 \end{array} \right)}_{ST4} \right)$$

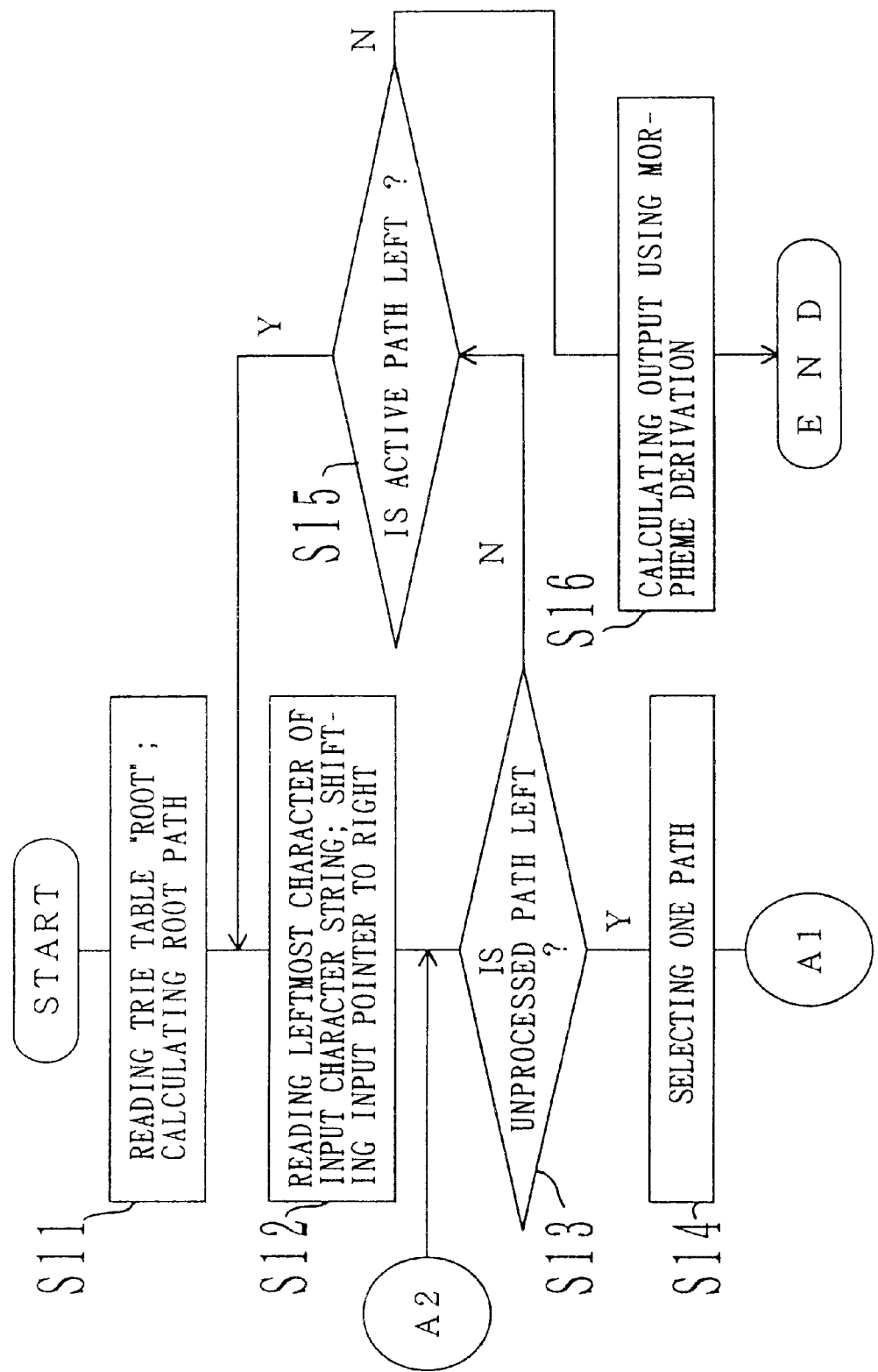

FIG. 12

[0] $\left(\begin{pmatrix}\text{"root"}\\0\\0\\0\\0\\7\end{pmatrix}\right)$

[1.1] $\left(\begin{pmatrix}\text{"root"}\\0\\0\\0\\0\\7\end{pmatrix}\begin{pmatrix}\text{"a-"}\\f\\a\\((/a)\Rightarrow(/f)\;\|\;0)\\1\text{ ERROR, WEIGHT }0.6\\8\end{pmatrix}\right)$

[1.2] $\left(\begin{pmatrix}\text{"root"}\\0\\0\\0\\0\\7\end{pmatrix}\begin{pmatrix}\text{"r-"}\\f\\r\\((/r)\Rightarrow(/f)\;\|\;0)\\1\text{ ERROR, WEIGHT }0.6\\8\end{pmatrix}\right)$

[1.3] $\left(\begin{pmatrix}\text{"root"}\\0\\0\\0\\0\\7\end{pmatrix}\begin{pmatrix}\text{"a-"}\\f\\a\\\bowtie\\1\text{ ERROR, WEIGHT }0.4\\8\end{pmatrix}\right)$

[1.4] $\left(\begin{pmatrix}\text{"root"}\\0\\0\\0\\0\\7\end{pmatrix}\begin{pmatrix}\text{"r-"}\\f\\r\\\bowtie\\1\text{ ERROR, WEIGHT }0.4\\8\end{pmatrix}\right)$

[1.5] $\left(\begin{pmatrix}\text{"root"}\\0\\0\\0\\0\\7\end{pmatrix}\begin{pmatrix}\text{"f-"}\\f\\f\\0\\0\\8\end{pmatrix}\right)$

FIG. 13

"root"
0
0
0
7

"a-"
f
a
((/a) ⟹ (/f) ≠ 0)
1 ERROR, WEIGHT 0.6
8

(a, Art),

[2.1] $\left(\left(\begin{array}{c}\text{"root"}\\0\\0\\0\\0\\7\end{array}\right)\left(\begin{array}{c}\text{"a-"}\\f\\a\\\bowtie\\1\text{ ERROR, WEIGHT }0.4\\8\end{array}\right)\left(\begin{array}{c}\text{"ar-"}\\r\\r\\0\\1\text{ ERROR, WEIGHT }0.4\\9\end{array}\right)\right)$

[2.2] $\left(\left(\begin{array}{c}\text{"root"}\\0\\0\\0\\0\\7\end{array}\right)\left(\begin{array}{c}\text{"f-"}\\f\\f\\0\\0\\8\end{array}\right)\left(\begin{array}{c}\text{"fa-"}\\r\\a\\((/a)\Rightarrow(/r)\parallel 0)\\1\text{ ERROR, WEIGHT }0.6\\9\end{array}\right)\right)$

[2.3] $\left(\left(\begin{array}{c}\text{"root"}\\0\\0\\0\\0\\7\end{array}\right)\left(\begin{array}{c}\text{"f-"}\\f\\f\\0\\0\\8\end{array}\right)\left(\begin{array}{c}\text{"fo-"}\\r\\o\\((/o)\Rightarrow(/r)\parallel 0)\\1\text{ ERROR, WEIGHT }0.6\\9\end{array}\right)\right)$

[2.4] $\left(\left(\begin{array}{c}\text{"root"}\\0\\0\\0\\0\\7\end{array}\right)\left(\begin{array}{c}\text{"f-"}\\f\\f\\0\\0\\8\end{array}\right)\left(\begin{array}{c}\text{"fa-"}\\r\\a\\\bowtie\\1\text{ ERROR, WEIGHT }0.4\\9\end{array}\right)\right)$

[2.5] $\left(\left(\begin{array}{c}\text{"root"}\\0\\0\\0\\0\\7\end{array}\right)\left(\begin{array}{c}\text{"f-"}\\f\\f\\0\\0\\8\end{array}\right)\left(\begin{array}{c}\text{"fr-"}\\r\\r\\0\\0\\9\end{array}\right)\right)$

FIG. 15

$$[3.1] \quad \left( \begin{pmatrix} \text{"root"} \\ 0 \\ 0 \\ 0 \\ 0 \\ 7 \end{pmatrix} \begin{pmatrix} \text{"f-"} \\ f \\ f \\ 0 \\ 0 \\ 8 \end{pmatrix} \begin{pmatrix} \text{"fr-"} \\ r \\ r \\ 0 \\ 0 \\ 9 \end{pmatrix} \begin{pmatrix} \text{"fro-"} \\ o \\ o \\ 0 \\ 0 \\ 10 \end{pmatrix} \right)$$

| "root" | "f-" | "f-" | "fr-" | "fro-" | "from-" |
|---|---|---|---|---|---|
| o | f | f | r | o | m |
| o | f | f | r | o | m |
| o | o | o | o | o | o |
| 7 | 8 | 9 | 10 | 11 |

[4.2]

| "root" | "f-" | "fo-" |
|---|---|---|
| o | f | r |
| o | f | o |
| o | o | |
| 7 | 8 | |

((/o) ⇒ (/r) ‖ 0)
1 ERR, WGT 0.6
9

| "for-" | "form-" |
|---|---|
| o | m |
| r | m |
| ✗ | o |
| 1 ERR, WGT 0.6 | 1 ERR, WGT 0.6 |
| 10 | 11 |

[4.3]

| "root" | "p-" | "pr-" | "pro-" | "prom-" |
|---|---|---|---|---|
| o | f | r | o | m |
| o | p ✗ | r | o | m |
| o | | o | o | o |
| 1 ERR, WGT 0.4 | | 1 ERR, WGT 0.4 | 1 ERR, WGT 0.4 |
| 7 | 8 | 9 | 10 | 11 |

[4.4]

| "root" | "f-" | "fr-" | "fro-" | "frog-" |
|---|---|---|---|---|
| o | f | r | o | m |
| o | f | r | o | g ✗ |
| o | o | o | o | |
| 7 | 8 | 9 | 10 | 1 ERR, WGT 0.4 |
| | | | | 11 |

FIG. 17A

TRIE TABLE "a-"

| INPUT CHARACTER | DICTIONARY WORD | TRIE TABLE LINK |
|---|---|---|
| a | Art | aa- |
| b | 0 | ab- |
| c | 0 | ac- |
| ⋮ | ⋮ | ⋮ |
| r | 0 | ar- |
| ⋮ | ⋮ | ⋮ |
| x | 0 | ax- |
| y | 0 | ay- |
| z | 0 | az- |

FIG. 17B

TRIE TABLE "ar-"

| INPUT CHARACTER | DICTIONARY WORD | TRIE TABLE LINK |
|---|---|---|
| a | 0 | ara- |
| b | 0 | arb- |
| c | N | arc- |
| ⋮ | ⋮ | ⋮ |
| o | 0 | aro- |
| ⋮ | ⋮ | ⋮ |
| u | 0 | aru- |
| y | suff | ary- |

FIG. 17C

TRIE TABLE "aro-"

| INPUT CHARACTER | DICTIONARY WORD | TRIE TABLE LINK |
|---|---|---|
| i | 0 | aroi- |
| m | 0 | arom- |
| s | 0 | aros- |
| u | 0 | arou- |

FIG. 17D

TRIE TABLE "arom-"

| INPUT CHARACTER | DICTIONARY WORD | TRIE TABLE LINK |
|---|---|---|
| a | N | aroma- |

FIG. 17E

TRIE TABLE "from-"

| INPUT CHARACTER | DICTIONARY WORD | TRIE TABLE LINK |
|---|---|---|

FIG. 19

$$[2.6] \quad \left(\left(\begin{array}{c}\text{"root"}\\0\\0\\0\\0\\3\end{array}\right)\left(\begin{array}{c}\text{"v-"}\\v\\v\\0\\0\\4\end{array}\right)\left(\begin{array}{c}\text{"ve-"}\\e\\e\\0\\0\\5\end{array}\right)\right)$$

$$[3.3] \quad \left(\left(\begin{array}{c}\text{"root"}\\0\\0\\0\\0\\3\end{array}\right)\left(\begin{array}{c}\text{"v-"}\\v\\v\\0\\0\\4\end{array}\right)\left(\begin{array}{c}\text{"ve-"}\\e\\e\\0\\0\\5\end{array}\right)\left(\begin{array}{c}\text{"ven-"}\\n\\n\\((/n)\Rightarrow 0)\\1\text{ ERR WGT }0.3\\6\end{array}\right)\right)$$

$$[4.5] \quad \left(\left(\begin{array}{c}\text{"root"}\\0\\0\\0\\0\\3\end{array}\right)\left(\begin{array}{c}\text{"v-"}\\v\\v\\0\\0\\4\end{array}\right)\left(\begin{array}{c}\text{"ve-"}\\e\\e\\0\\0\\5\end{array}\right)\left(\begin{array}{c}\text{"ven-"}\\n\\n\\((/n)\Rightarrow 0)\\1\text{ ERR WGT }0.3\\6\end{array}\right)\left(\begin{array}{c}\text{"ven-"}\\n\\0\\\bowtie\\1\text{ ERR WGT }0.3\\7\end{array}\right)\right)$$

$$[4.6] \quad \left(\left(\begin{array}{c}\text{"root"}\\0\\0\\0\\0\\3\end{array}\right)\left(\begin{array}{c}\text{"v-"}\\v\\v\\0\\0\\4\end{array}\right)\left(\begin{array}{c}\text{"ve-"}\\e\\e\\0\\0\\5\end{array}\right)\left(\begin{array}{c}\text{"ven-"}\\n\\n\\0\\0\\6\end{array}\right)\left(\begin{array}{c}\text{"vene-"}\\e\\e\\0\\0\\7\end{array}\right)\right)$$

TRIE TABLE "ve-"

| INPUT CHARACTER | DICTIONARY WORD | TRIE TABLE LINK |
|---|---|---|
| a | 0 | *vea-* |
| c | 0 | *vec-* |
| d | 0 | *ved-* |
| e | 0 | *vee-* |
| g | 0 | *veg-* |
| h | 0 | *veh-* |
| i | 0 | *vei-* |
| l | 0 | *vel-* |
| n | 0 | *ven-* |
| r | 0 | *ver-* |
| s | 0 | *ves-* |
| t | N, V | *vet-* |
| x | V | *vex-* |

FIG. 21A

TRIE TABLE "ven-"

| INPUT CHARACTER | DICTIONARY WORD | TRIE TABLE LINK |
|---|---|---|
| a | 0 | *vena-* |
| d | V | *vend-* |
| e | 0 | *vene-* |
| g | 0 | *veng-* |
| i | 0 | *veni-* |
| o | 0 | *veno-* |
| t | V | *vent-* |
| u | 0 | *venu-* |

FIG. 21B

TRIE TABLE "vene-"

| INPUT CHARACTER | DICTIONARY WORD | TRIE TABLE LINK |
|---|---|---|
| e | 0 | *venee-* |
| r | 0 | *vener-* |
| s | 0 | *venes-* |
| t | 0 | *venet-* |
| z | 0 | *venez-* |

FIG. 21C

TRIE TABLE "venee-"

| INPUT CHARACTER | DICTIONARY WORD | TRIE TABLE LINK |
|---|---|---|
| r | N | *veneer-* |

FIG. 21D

TRIE TABLE "venet-"

| INPUT CHARACTER | DICTIONARY WORD | TRIE TABLE LINK |
|---|---|---|
| i | 0 | *veneti-* |

FIG. 21E

CHARACTER STRING CORRECTION SYSTEM AND METHOD USING ERROR PATTERN

BACKGROUND OF THE INVENTION

1. Field of the Invention

The present invention relates to a morphological analysis and, more specifically, to a character string correction system and method for analyzing an input character string (including a symbol, etc.) and outputting a corresponding character string as a recognition result.

2. Description of the Related Art

Morphological analysis divides an input sentence into words and is the most basic step in text processing (or natural language processing), and has therefore been the subject of much research. Most of the prior art however focuses on dictionary retrieval, in the sense that the processor simply receives the words as the writer has delimited them (using spaces and punctuation marks), and merely looks them up in the dictionary (sometimes correcting spelling errors by some approximation method or other).

However, spaces and punctuation marks can be mispositioned or forgotten just as other characters can. Also, some languages (e.g. Chinese, Japanese) don't use spaces to delimit words and moreover some languages (e.g. German, Dutch) allow much freedom in concatenating dictionary words to make new words.

Because of these phenomena, one cannot rely completely on spaces and punctuation marks to indicate word boundaries.

An alternative method is to read the input character by character and to match it with the words in the dictionary character by character. Using this method, the input characters can be processed without a preconceived notion of where a word ends, and a word will be judged to have ended if the characters read in up to a certain point correspond to a dictionary word and the rest of the input fails to match with the dictionary.

Such a mechanism can be implemented in several ways, conceptually the most simple one being to keep the entire dictionary in memory and to successively discard words that don't match the input word.

The most common method, however, involves reorganizing the dictionary words into a number of tables (called TRIE table) that reference each other. Thus there would be one table (TRIE table 'root') that holds the initial characters of all the words in the dictionary. For example, the table entry containing the character 'a' would point to another table which holds all the characters in second positions of words starting with an 'a'. This method is commonly known as the TRIE method. (Donald E. Knuth. The Art of Computer Programming. Volume 3: Storing and Searching. Addison-Wesley Series in Computer Science and Information Processing. Addison-Wesley Company, Reading (Mass.), 1973.)

FIGS. 1A through 1D show a simple example of some TRIE tables and their connections. The first column in each of the TRIE tables, titled "input character", gives the characters that might occur at the particular point in the word that each of these TRIE table represents. Note that although the tables in FIGS. 1A through 1D contain only alphabetical characters, this is not necessarily so: numbers, punctuation marks and even spaces can also be used in this column.

The TRIE table "root" shown in FIG. 1A is the high order TRIE table storing the first input character of all words, that is, storing all alphabetical characters.

The second column, titled "dictionary word" indicates whether the string of characters read up to this point corresponds to a dictionary entry or not. In the example shown in FIGS. 1A through 1D, this is done by giving the part-of-speech of the entry if it does. For example, "Art", "N", "Prop. N", and "Prep" respectively indicate an article, noun, proper noun, and preposition, and the empty-set symbol "φ" if it doesn't.

For example, the input character "a" in the TRIE table "r" shown in FIG. 1B corresponds to two dictionary words, that is, the chemical symbol "ra" (n) indicating radium and "ra" (prop. N) indicating the name of an Egyptian god.

The third column, titled "TRIE table link", gives the name of the TRIE table corresponding to the position in the input word achieved by processing the character from the first column to indicate the connection to the subsequent TRIE table. For example, the TRIE table link "r-" of the TRIE table "root" refers to the TRIE table "r-". The TRIE table link "rd-" of the TRIE table "r-" refers to the TRIE table "rd" shown in FIG. 1C. The TRIE table link "rd-" of the TRIE table "rd" refers to the TRIE table "rd.-" shown in FIG. 1D. The TRIE table that contains no entry, for example, the TRIE table "rd.-" shown in FIG. 1D indicates that there are no corresponding dictionary entries having subsequent characters.

The flowchart in FIG. 2 gives a simple example of an implementation of the basic TRIE method. The recognizing process is described below by referring to the character "Rd." in FIG. 2.

When the process starts, the TRIE table "root" is read (step S1), the leftmost character "R" of the input character string is read, and the input pointer is shifted to right (step S2). Then, the read character is checked whether or not it is entered as an input character in the TRIE table "root" (step S3). Since the character "R" ("r") is in the TRIE table "root", the corresponding TRIE table "r-" pointed to by the TRIE table link is read (step S4).

Next, the first character "d" in the remaining characters is read (step S2), and the TRIE table "rd-" pointed by the corresponding TRIE table link in the TRIE table "r-" is read (step S4). Then, the character "." is read (step S2), and the TRIE table "rd.-" corresponding in the TRIE table "rd-" and pointed by the TRIE table link is read (step S4).

Then, a space character " " is read (step S2). Since the TRIE table "rd.-" is empty and has no corresponding entry, it is checked whether or not the character string "Rd." is a dictionary entry (step S5). As the character string "Rd." is short for "Road" and entered in the dictionary, it is recognized as a word (step S6), thereby terminating the process.

The TRIE table "rd.-" contains no entry because the dictionary has no entry of the word starting with the three-character string "rd." followed by subsequent characters.

If the dictionary contains no entry in step S5, the last read character in the read character string is discarded character by character (steps S7 and S8). When the remaining character string matches one of the entries in the dictionary (Yes in step S5), the character string is recognized as a word (step S6). If all characters are discarded and no corresponding dictionary entry is found (No in step S8), the analysis fails (step S9).

Described below is an example of a process in steps S5 through S8 of successfully recognizing a character string in step S6 by discarding the last character in step S7. Assume that the word "catch 22" as well as "catch" is a dictionary entry. Since the entry "catch-" contains " " (space), the next character "t" is read together when the character string "catch the dog" is entered (step S2). However, "t" is not contained in the entry of the TRIE table "catch-" (No in step S3), and the character string "catch " ("catch(space)") is not entered in the dictionary (No in Step S5). Accordingly, the last character " " (space) is discarded (step S7), and the character string "catch" is recognized as a word (step S6).

Detection of spelling errors and spelling alternatives in such a system can be done in two ways, either by waiting for a mismatched to occur and looking for alternatives from that point, or by assuming that any character could be erroneous (even if it matches), and computing alternative paths all the time.

As an example, consider the words "airborne", "airconditioned", and "airport", and assume that "airport" has been misspelled "airbort". In a morphological analysis system that waits for a mismatch, processing will proceed until the final 't' before it realizes something is wrong. It will then assume the 't' is a misspelling for 'n', and continue processing from there, and it would have to backtrack in order to find that "airport" is also a possible alternative. In this example, "airport" is more likely as there is only one misspelled character (the 'b', which should have been a 'p'), while if "airborne" were the correct answer the input word would contain two consecutive misspellings (a 't' in place of the 'n', and the final 'e' would have been omitted). Therefore, there is a higher possibility that "airport" is correct.

In a morphological analysis system that routinely computes alternative paths, the possibility that the 'b' is a misspelling (for 'p' or 'c', among others), is assumed straight away when the 'b' is read in. This system will read on notice that the 'c' is unlikely due to followup characters, hang on to the alternative "airborne" a little longer but in the end dismiss it in favour of "airport".

However, the above described conventional morphological analysis has the following problems.

Note that in the above analysis there is a large number of other paths that have not been taken into consideration: this was done to keep the example simple and each to understand.

Note also that if any character can be a misspelling for any other character (and if any character can be superfluous, and if any character from the intended word can have been left out), then any word can be misspelling for any word, which is obviously not a desirable situation.

This situation is generally forestalled by checking the analysis paths against some kind of criterium or criteria, for instance that there be no more than 2 errors in any word, and to discontinue processing for paths that fail to meet the criterium. Some possible criteria that can be used to check whether an error is probable or not include the number of errors in a word, the presence or not of consecutive spelling errors, or (if errors are weighted) the total weight of the spelling errors detected, or any combination of these strategies. However, in the conventional morphological analysis method, a number of alternative paths still remain after these strategies, thereby leaving the problem of low performance.

SUMMARY OF THE INVENTION

The present invention aims at providing an information processing system and method for performing a morphological analysis by efficiently correcting errors contained in an input character string and outputting a corresponding character string as a recognition result.

The character string correction system of the present invention is an information processing system for performing a morphological analysis by comparing an input character string with a dictionary entry, and comprises a dictionary storage unit; an error pattern storage unit; and a retrieving unit. The dictionary storage unit stores a dictionary containing an entry of the input character to be compared with the characters of the input character string. The error pattern storage unit stores an error pattern prescribed as a type of error that may be detected in the input character string. The retrieving unit retrieves a dictionary entry corresponding to the input character string from the dictionary stored in the dictionary storage unit using the error pattern stored in the error pattern storage unit, and outputs the result as a candidate for a recognized word.

In the above described character string correction system, the error pattern storage unit preliminarily stores an error pattern prescribed as a type of possible error of the errors that may be made to the input character string. Then, the retrieving unit searches the dictionary in the dictionary storage unit using the error pattern, thereby performing a retrieving process under the assumption of a specific error type, limiting the number of alternative paths generated corresponding to the input character string, and efficiently performing the retrieval.

BRIEF DESCRIPTION OF THE DRAWINGS

FIGS. 1A through 1D are the TRIE tables for use in retrieving rd.;

FIG. 5 shows the error pattern according to the embodiment of the present invention;

FIGS. 6A through 6C show examples and formats of the analysis paths according to the embodiment of the present invention;

FIG. 7 is a flowchart (1) showing the spelling correction process as an example of the character string correction process in the embodiment according to the present invention;

FIG. 12 shows the analysis path (1) according to the first embodiment;

FIG. 13 shows the morpheme derivation according to the first embodiment of the present invention;

FIG. 14 shows the analysis path (2) according to the first embodiment;

FIG. 15 shows the analysis path (3) according to the first embodiment;

FIG. 16 shows the analysis path (4) according to the first embodiment;

FIGS. 17A through 17E are the TRIE tables used in the first embodiment;

FIG. 19 shows the analysis path (1) according to the second embodiment;

FIGS. 21A through 21E are the TRIE tables for use in the second embodiment.

DESCRIPTION OF THE PREFERRED EMBODIMENTS

The embodiments of the present invention are described in detail by referring to the attached drawings.

Figure 2:
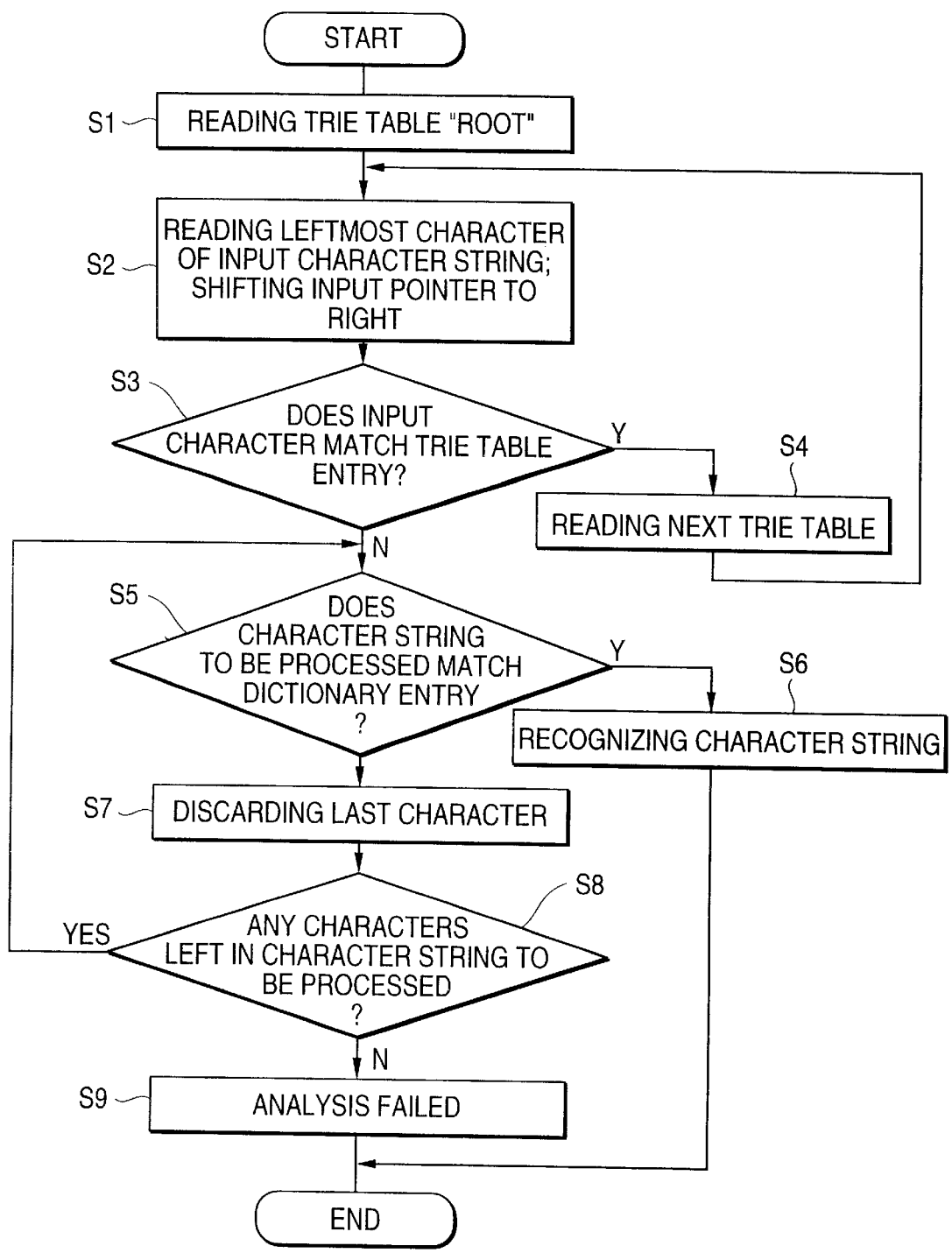
FIG. 2 is a flowchart showing the conventional TRIE method.
Figure 3:
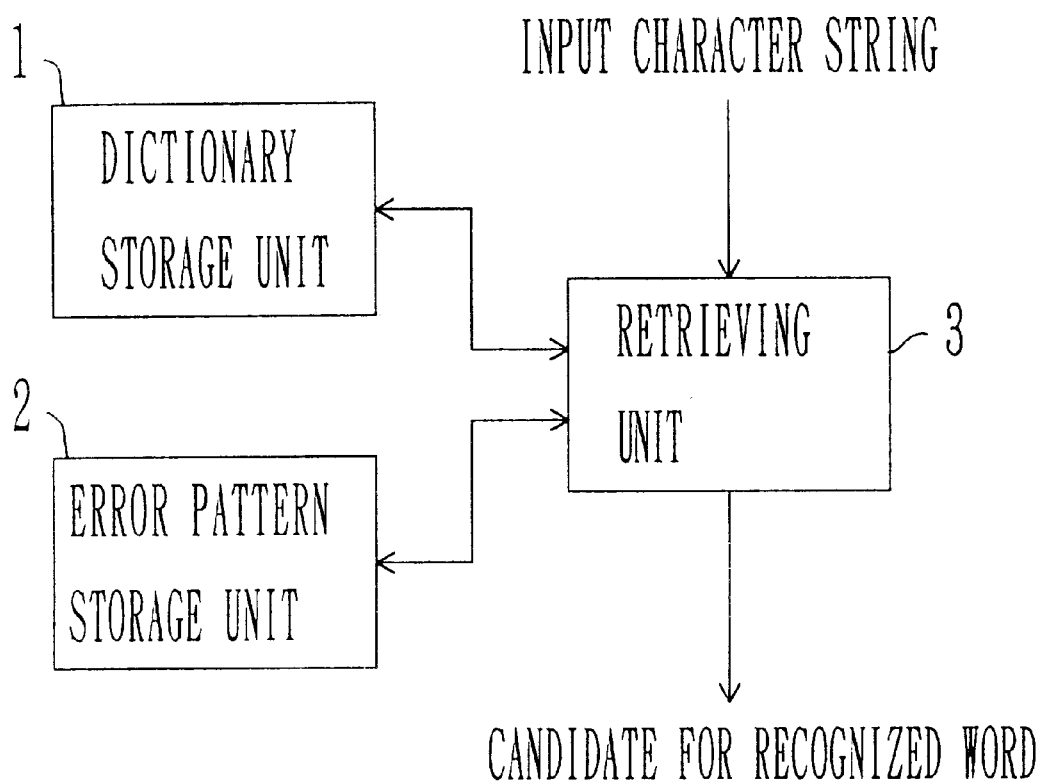
FIG. 3 shows the principle of the embodiment of the present invention.

FIG. 3 shows the principle of an embodiment of the character string correction system according to the present invention.

The character string correction system according to the present invention is used in the information processing system for performing a morphological analysis by comparing an input character string with a dictionary entry. It comprises a dictionary storage unit 1; an error pattern storage unit 2; and a retrieving unit 3.

The dictionary storage unit 1 stores a dictionary containing entries of input characters to be compared with characters in an input character string.

Error pattern storage unit 2 stores an error pattern prescribed as a type of error that may be contained in the input character string.

The retrieving unit 3 retrieves using the error pattern stored in the error pattern storage unit 2 a dictionary entry corresponding to the input character string from the dictionary stored in the dictionary storage unit 1. It outputs the retrieved entry as a candidate for a recognized character.

Figure 4:
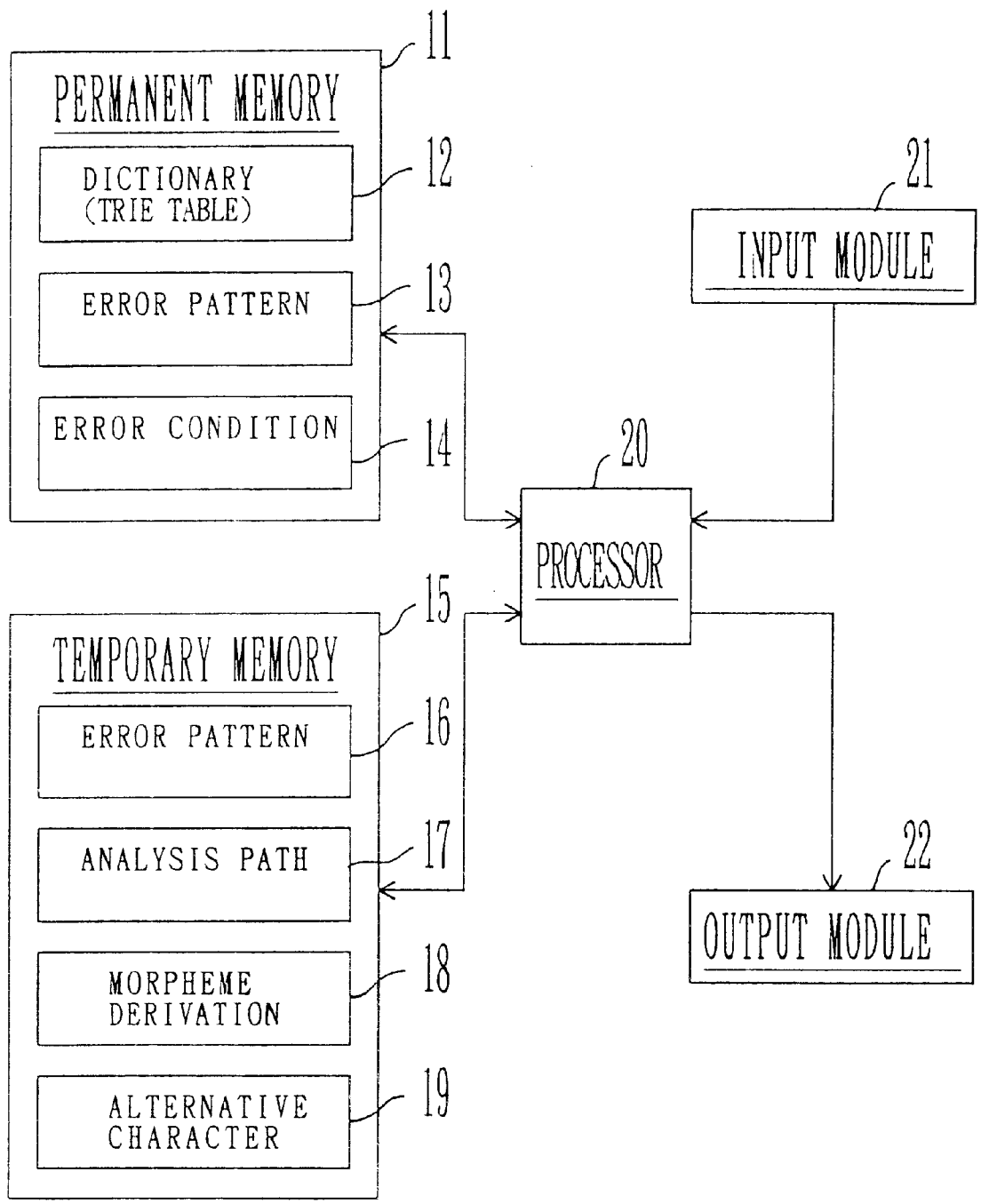
FIG. 4 shows the system according to the embodiment of the present invention.

The dictionary storage unit 1 shown in FIG. 3 corresponds to a permanent memory 11 in the configuration of the embodiment shown in FIG. 4. The error pattern storage unit 2 corresponds to a permanent memory 11 and a temporary memory 15. The retrieving unit 3 corresponds to a processor 20. The dictionary stored in the dictionary storage unit 1 corresponds to a dictionary 12 and contains, for example, a TRIE table, that is, a kind of retrieval table.

The dictionary storage unit 1 stores a dictionary comprising a plurality of TRIE tables. The retrieving unit 3 compares the characters in the input character string with the entries of input characters in the TRIE table. If they match each other, the retrieving unit 3 sequentially accesses the next TRIE tables specified by the TRIE table link. When the final dictionary entry is obtained for the input character string, the word is a candidate for a recognized word.

In the above described input character string recognizing process, the retrieving unit 3 refers to the error pattern stored in the error pattern storage unit 2, assumes that the input character string contains the corresponding type of error, and corrects the input character string. Then, based on the correction results, the input character string is further compared with the dictionary entries. When the dictionary entry is recognized, the word is output as a candidate for a recognized word.

The user generates an appropriate error pattern and stores it in the error pattern storage unit 2, or specifies any of the error patterns stored in the error pattern storage unit 2 so that the retrieving unit 3 can perform a process under the assumption of a specific error. Therefore, the number of the alternative paths generated corresponding to the input character is limited, thereby efficiently performing the retrieving process.

Furthermore, the weight of an error can be determined for each error pattern. Using the weight, the conditions of whether or not an error pattern should be applied can be determined.

FIG. 4 shows the configuration of the character string correction system according to an embodiment of the present invention.

The character string correction system shown in FIG. 4 precisely adjusts an error in recognizing a word and outputs the result as a candidate for a recognized word.

The character string correction system shown in FIG. 4 comprises the permanent memory 11; temporary memory 15; processor 20; an input module 21: and an output module 22.

The permanent memory 11 stores the dictionary 12; an error pattern 13; and an error condition 14.

The dictionary 12 is a dictionary compiled for retrieval. In the present embodiment, the TRIE tables are used as the dictionary 12.

The temporary memory 15 stores an error pattern 16; an analysis path 17; a morpheme derivation 18; and an alternative character 19.

The input module 21 reads an input character string and holds the value of an input pointer indicating the position of each character in the character string.

The processor 20 performs a retrieving process for an input character string by accessing the permanent memory 11, referring to the dictionary 12, error pattern 13, and error condition 14, and storing an intermediate result in the temporary memory 15. At this time, a part of the error pattern 13 is fetched and stored in the temporary memory 15 as the error pattern 16.

The output module 22 outputs the result of the above described retrieving process performed by the processor 20 as a recognition result to, for example, the processing device at the next stage.

The error pattern 16 is used in defining the type of spelling error recognized and amended by the processor 20. That is, the error pattern 16 is used to provide a simple and efficient interface in consideration of the type of text to be analyzed, a spelling error easily made by a user who generates and inputs a character string, a request from the environment containing the type of language, etc., and a request from the analyzing process.

In the character string correction system having the above described configuration shown in FIG. 4, the processor 20 reads the input character string character by character, and sequentially compares it with the error pattern 16 stored in the temporary memory 15. If it matches any of the error patterns, it is assumed that the input character is a misspelling. At this time, the alternative character 19 is generated and the input character corresponding to the error pattern is replaced with one of the alternative characters 19. Each time one input character is read, the corresponding analysis path 17 is stored in the temporary memory 15.

The analysis path 17 shows the state of a specific analyzing process up to the point where the last read character is processed.

The processor 20 retrieves the TRIE table using the corrected character, and stores the analysis path as the morpheme derivation 18 up to the point in the temporary memory 15 if a corresponding dictionary word can be retrieved. When all possible morpheme derivations 18 can be obtained, their corresponding words are transmitted to the error pattern storage unit 22. The output module 22 outputs one or more corresponding words obtained as recognition results to a display device, a printer, or a next processing device at the next stage in a document processing system, etc.

The character string correction system shown in FIG. 4 adjusts the error correction in recognizing a word and outputs a candidate as a process result after the recognition.

In the character string correction system, error patterns are independent of the analysis algorithm itself, and therefore can be easily amended. This characteristic makes the morpheme analysis and character string correction system flexible. For example, even if error patterns depend on input methods, the process can be flexibly performed by selecting and using the optimum error pattern.

FIG. 5 shows an example of the error pattern 13 stored in the permanent memory 11.

In FIG. 5, [0] shows the format of an error pattern, and [1] through [5] show examples of error patterns for the type of the error pattern shown by [0].

The type of the error pattern indicated by [0] shown in FIG. 5 implies that one error pattern comprises a fault pattern, a correct pattern, conditions, and a weight value. The fault pattern indicates a pattern containing a misspelling, and the correct pattern indicates a correct spelling for replacing the fault pattern. A set of conditions govern the application of the error pattern. A weight value expresses the weight to be associated with this particular error. The fault pattern and correct pattern can be represented by specific characters or constants. They also can be variables representing characters.

For example, 'x' and 'y' in the error patterns [1], [2], [4], and [5] refer to variables. (xy)⇒(yx) in error pattern [1] indicates that the two characters may replace each other. (x≠y) expresses the conditions of error pattern [1] indicates the rules governing the variables x and y. If x=y, the fault pattern equals the correct pattern, and the error pattern [1] is insignificant, thereby setting the condition (x≠y). If the condition ((x∈vowel))∧(y∈consonant)) is set instead of the above described condition, then error pattern [1] is applied only to the set of characters the first character of which refers to a vowel and the second character refers to a consonant. The weight values (0, 6) express the weight for use in expressing error pattern [1] by values.

Error pattern [2] indicates an error in which a character (x) is replaced with another character (y).

Error pattern [3] indicates an error in which a "tois" is input in place of the character string "tions".

Error pattern [4] indicates an error in which a character is mistakenly input twice.

Error pattern [5] indicates an error in which only the second character of a two-character word is input.

In error patterns [3] and [4], the conditions "φ" indicate that there are no conditions specified or no restrictions.

The processor 20 reads an input character string character by character and compares the read data with the fault pattern of the error pattern 16 stored in the temporary memory 15. If the read character string matches the fault pattern in any error pattern, it is assumed that the input character is a misspelling. At this time, the alternative character 19 is generated from a correct pattern, and the input character corresponding to the fault pattern is replaced with one of the alternative characters 19. Each time an input character is read, the corresponding analysis path 17 is stored in the temporary memory 15.

FIGS. 6A through 6C show examples of the analysis paths 17 stored in the temporary memory 15. FIG. 6A shows a type of the analysis path and indicates that one analysis path comprises one or more steps. One step contains data of a current TRIE table; a last-read character; a substituted character or characters; an error pattern in progress, an error statistics so far up to the step; and an input pointer position.

The current TRIE table indicates the name of a newly read TRIE table. The last-read character represents the last character read from the input character string. A substituted character refers to a character (string) selected from the alternative character 19, or a character (string) for substitution specified by an error pattern. An error pattern in progress is obtained by rewriting an error pattern selected from the error pattern 16 in a way that the latest state after a process of one character can be expressed. The error statistics so far refers to the information about the number of applications of error patterns. For example, the information indicates the number of errors applied to a character string to be processed and the sum of weight values of errors. The input pointer position refers to the value of an input pointer pointing to the next input character.

FIG. 6B shows a root path generated in the first step of the process as an example of the format of the analysis path shown in FIG. 6A. The root path comprises only one step, and indicates that the current TRIE table refers to "root" while the input pointer position refers to "0". It also indicates that the last-read character, substituted character or characters, error pattern in progress, and error statistics so far are empty (φ).

FIG. 6C shows an analysis path in which a correct word "cat" can be recognized in the process where the word "cat" has been misspelled "cta". This analysis path comprises four steps ST1, ST2, ST3, and ST4, and each step accesses the TRIE tables "root", "c-", "ca-", and "cat-". No error patterns are applied in steps ST1 and ST2, but error pattern [1] shown in FIG. 5 is applied in step ST3.

In this example, the character t is substituted for the variable x in error pattern [1], but the character preceded by the character t has not been input. Therefore, all characters other than "t" correspond to the variable y. In this analysis path, the substituted character a is substituted for the variable y. Thus, error pattern [1] can be practically expressed as (/t/a)⇒(/a/t). Since the first character t of the fault pattern has been read, (/a)⇒(/t) finally remains. As the variables x and y are removed from the pattern at this point, the condition (x≠y) is not required, thereby keeping the condition of the error pattern in step ST3 empty.

Since error pattern [1] is applied in step ST3, the error statistics information in steps ST3 and ST4 is set to 1 for the number of errors and 0.6 for the weight of error pattern [1]. After all, the analysis path provides a path for generating the character string "cat" by replacing t and a with each other in the input character string "cta".

Thus, the analysis path represents the state of the specific analysis process up to the point where the last-read character is processed.

The processor 20 retrieves the TRIE table using the corrected character, and stores the analysis path up to the point as the morpheme derivation 18 in the temporary memory 15 if the corresponding dictionary word has been retrieved. When all possible morpheme derivations are obtained, the corresponding words are transmitted to the output module 22. The output module 22 outputs as a recognition result one or more corresponding words obtained as a result of the process to a display device, printer, or processing device at the next stage of a documentation system, etc.

According to the present invention, an error pattern is independent of the analysis algorithm itself, and therefore can be easily modified. This characteristic makes the morpheme analysis and character string correction system flexible. For example, in a typed-document processing system, 'o' is adjacent to 'i' on the keyboard. Accordingly there is a high possibility that 'o' may be misspelled 'i'. In the system of recognizing a character string input through an optical reading device, 'o' may be misspelled 'c' because 'o' is visually similar to 'c'. Thus, even if error patterns are different depending on the input methods, data can be flexibly processed by selecting and using the optimum error pattern. Furthermore, the conditions used to be restrictions can be optionally defined.

As an embodiment of the present invention, a special user interface can be set to define an error pattern. The user interface represents a user request for an error pattern in a visually, or in other significance, desired format. The request is converted into another format used in the analysis process.

According to the descriptions below, when data is read from the temporary memory 15, the data is removed from the temporary memory 15, but data is not removed from the permanent memory 11 when it is read from the permanent memory 11.

FIGS. 7 through 10 are flowcharts showing the spelling correction process as an example of the character string correcting process according to the present embodiment.

Figure 8:
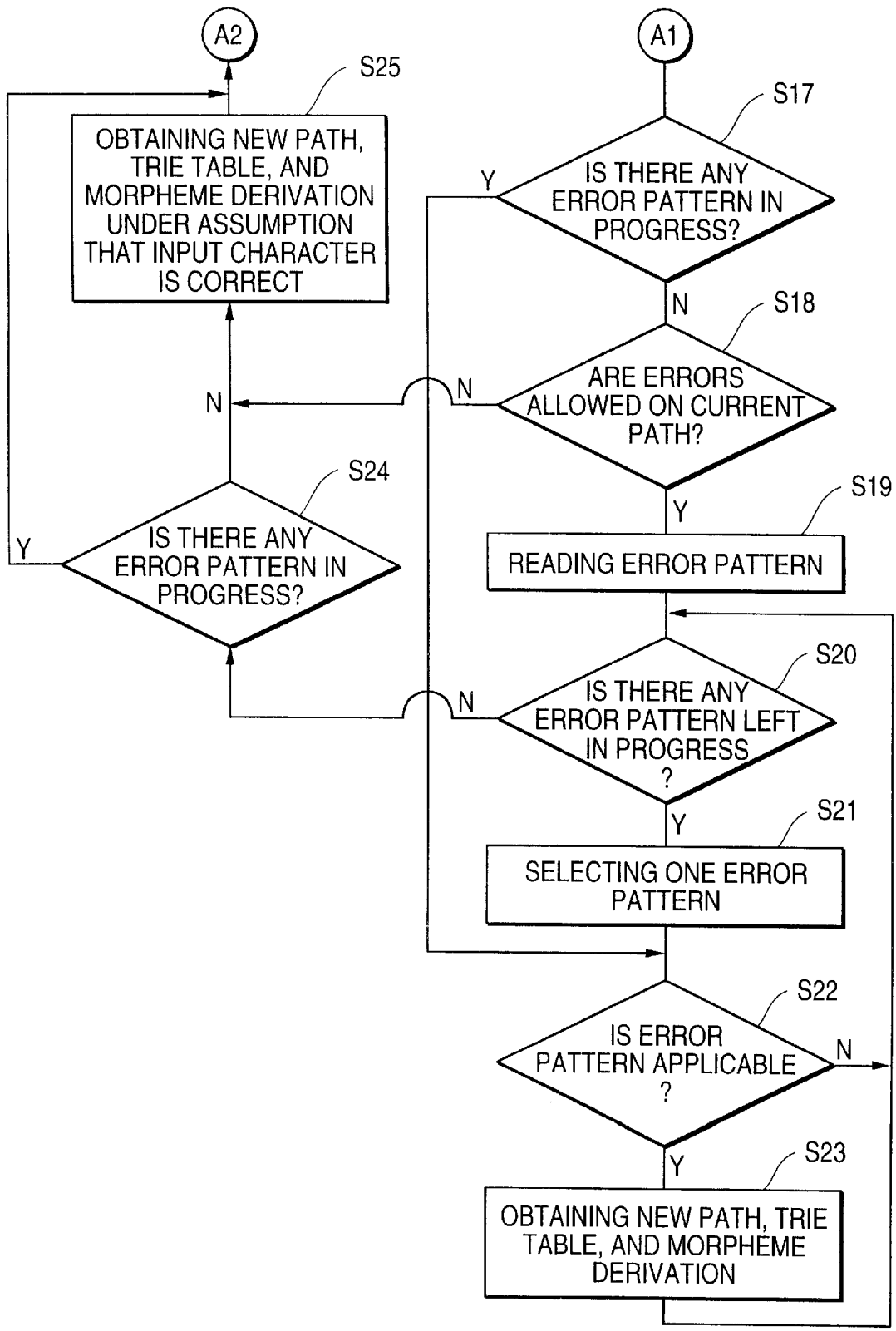
FIG. 8 is a flowchart (2) showing the spelling correction process as an example of the character string correction process in the embodiment according to the present invention.
Figure 9:
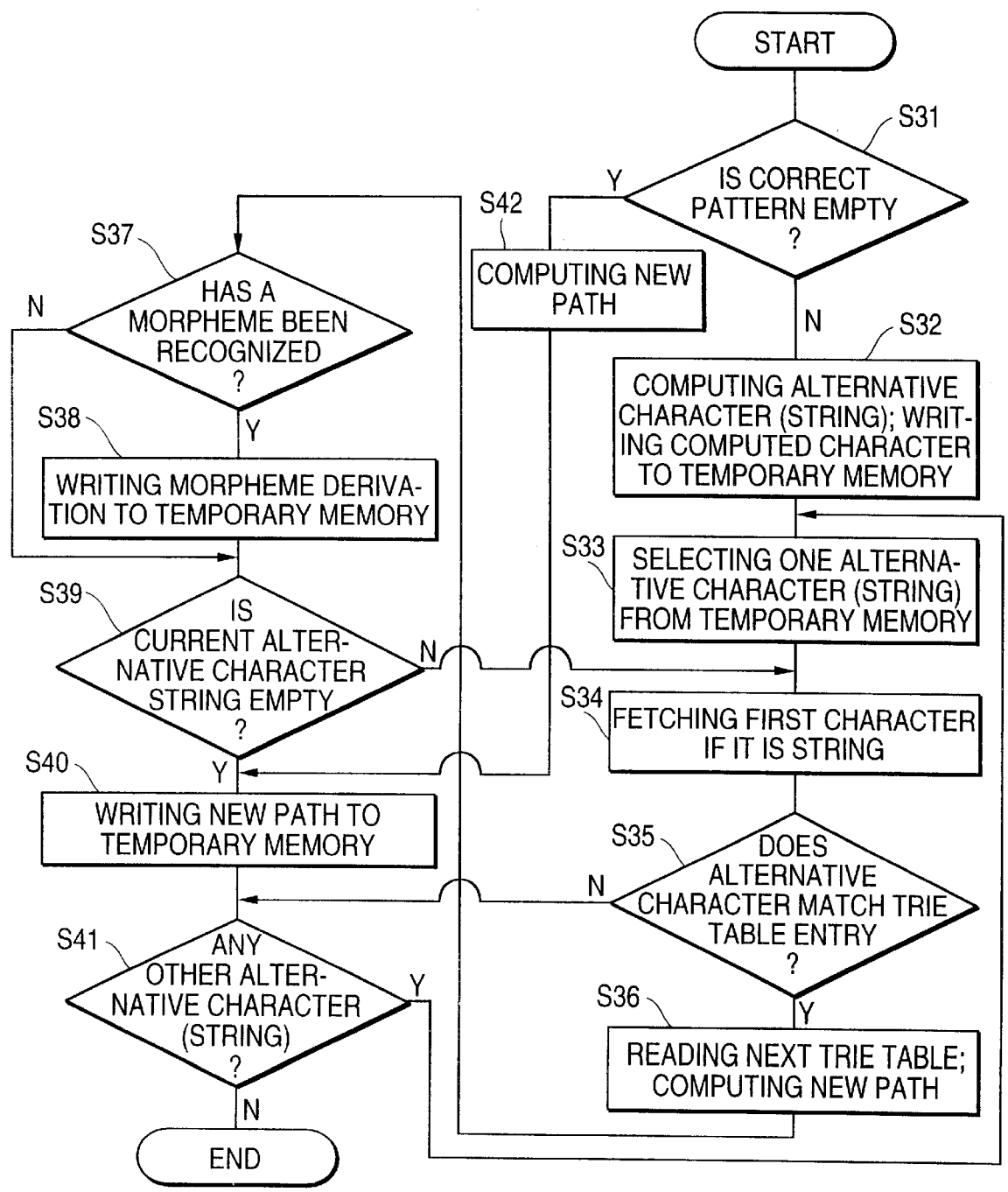
FIG. 9 is a flowchart showing in detail the process in step S23 shown in FIG. 8.
Figure 10:
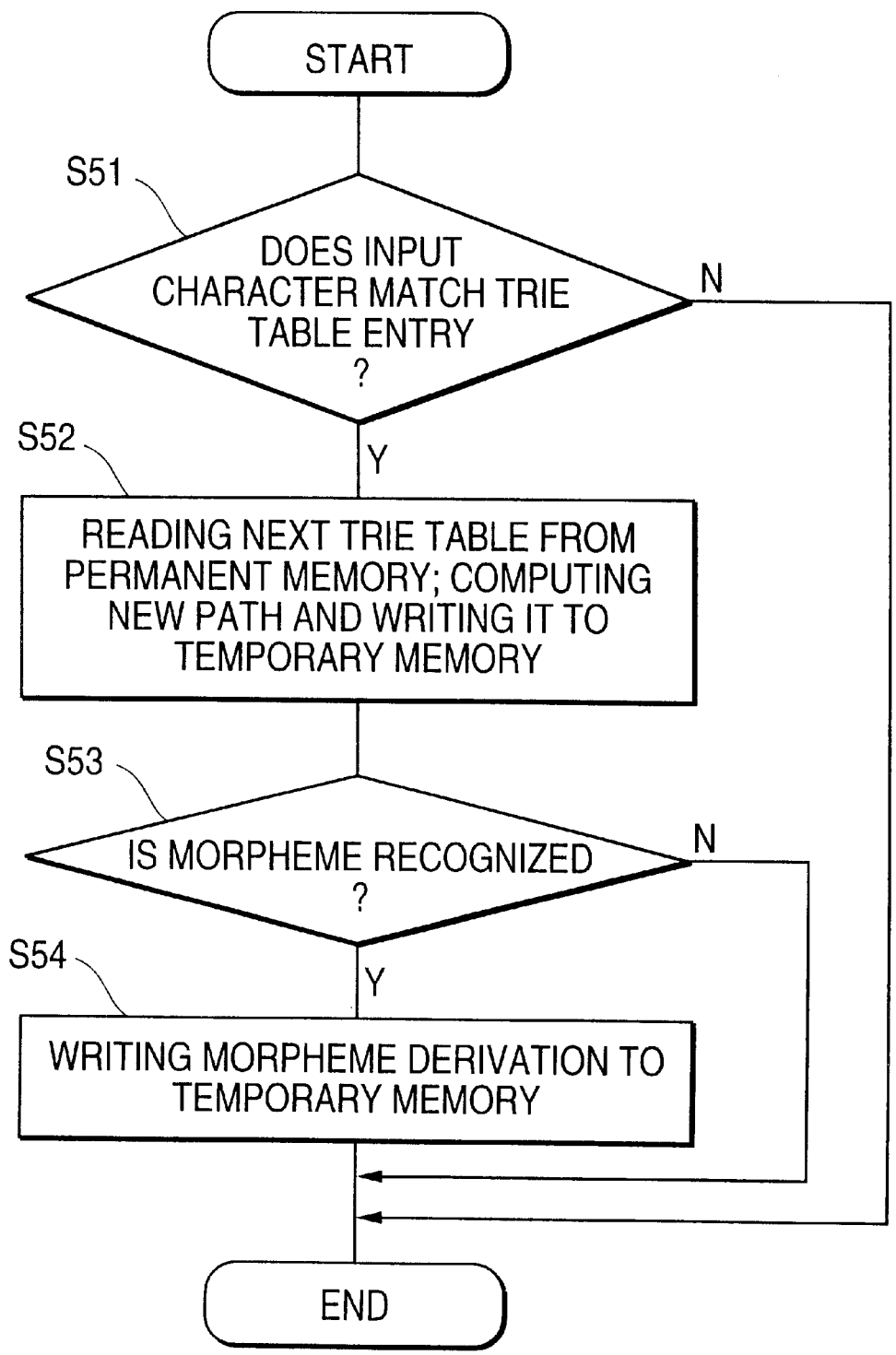
FIG. 10 is a flowchart showing in detail the process in step S25 shown in FIG. 8.

FIGS. 7 and 8 are flowcharts (1) and (2) of the spelling correction processes according to the present embodiment. FIGS. 9 and 10 are flowcharts showing the detailed processes in steps S23 and S25 in FIG. 8.

FIGS. 11 through 17E show the first embodiment corresponding to the above described spelling correction process.

The first embodiment shows the process in which the length of the fault pattern is equal to that of the correct pattern in an error pattern.

Furthermore, FIGS. 18A through 21E shows the second embodiment corresponding to the above described spelling correction process.

The first and second embodiments are described below by referring to the spelling correction process shown in FIGS. 7 through FIG. 10.

First, the flow of the process in FIGS. 7 and 8 are briefly described below.

When the process starts as shown in FIG. 7, the processor 20 initializes the system (step S11), reads an input character one by one (step S12), and generates as many analysis paths as possible for the input characters and the error pattern in the memory. Each time a new input character is read, a new analysis path is generated using the generated analysis path. The analysis path can be generated by combining some process loops.

The lowest order loop comprises steps S20, S21, S22, and S23 shown in FIG. 8, and the process is repeated for each error pattern in the temporary memory 15. Then, a new analysis process is generated based on a previously generated and specified analysis path, input character, and error pattern to be applied. The combination of the analysis path, input character, and error pattern that has successfully recognized a character string is written to the temporary memory 15 as the morpheme derivation 18. When the process has been completed on all error patterns, a new analysis path is generated according to the existing analysis path and the input character (step S25). At this time, no error pattern is applied, the input character is processed as a correct one, and the combination of the analysis path and input character that has successfully recognized the character string is written as a morpheme derivation.

A higher order loop comprises steps S13 and S14 in FIG. 7 and all the steps in FIG. 8. The process is performed for each analysis path generated from the input character. At this time, a preprocess is performed for each analysis path and it is determined whether or not an error pattern is applied on the path (step S17). If not, it is checked whether or not an error is allowed on the path (step S18).

If an error is allowed on the path, the processes in steps S20, S21, S22, S23, and S25 are performed on the path.

If no error is allowed, only the process in step S25 is performed. If the error pattern has been already applied, the loop comprising steps S20, S21, S22, and S23 is followed only once on the error pattern.

The processor 20 repeats the processes for a series of input characters until a new analysis path cannot be generated. When a new analysis path cannot be generated (No in step S15), an output is generated using the morpheme derivation 18 written in steps S23 and S25 (step S16).

The spelling correction process according to the first embodiment is described in detail by referring to FIGS. 7 through 17E.

The descriptions of the first embodiment is based on the following items.

(1) The input pointer is at position 7 at the start of the process.

(2) The character string on input starting at position 7 is "from".

(3) The error patterns in the permanent memory 11 are numbers [1] and [2].

(4) The error conditions 14 in permanent memory 11 that there can be no more than 1 type error in a word of less than 6 characters. Note also that as a general rule, an error pattern cannot be applied if another one is being processed already.

(5) The storage area of the temporary memory 15 are empty at the start of the process.

Figure 11:
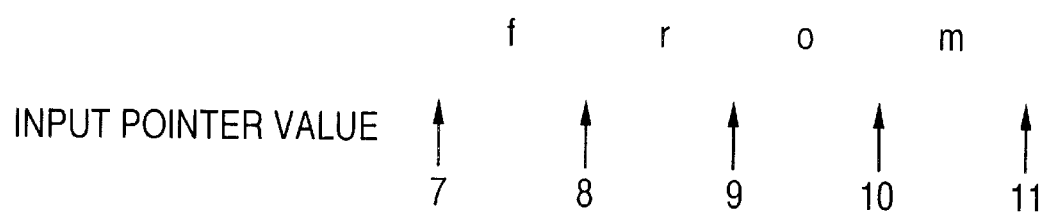
FIG. 11 shows an input character string according to the first embodiment of the present invention.

FIG. 11 shows the relationship between an input character string and an input pointer value according to the first embodiment. FIGS. 12, 14, 15, and 16 shows the analysis path according to the first embodiment. FIG. 13 shows the morpheme derivation according to the first embodiment. FIGS. 17A and 17E shows the TRIE tables used in the first embodiment. In FIG. 17B, "suff" in the column of the corresponding dictionary word represents a suffix.

In FIG. 7, the processor 20 first reads the TRIE table "root" as shown in FIG. 1A to calculate a root path (step S11). Since the input pointer value is 7, the root path is the analysis path [0] as shown in FIG. 12.

Then, the leftmost character in the input character string is read, and the input pointer is shifted to the right (step S12). In this case, the character 'f' is read at the position of the input pointer value 7 of the input character string "from", and the input pointer is shifted to position 8.

It is checked whether or not an unprocessed path exists among the analysis path in the temporary memory 15 (step S13). As unprocessed path refers to an analysis path ending with an input pointer value smaller than the actual input pointer value. In the present case, the temporary memory 15 contains only the root path [0] and is processed as an unprocessed path because the input pointer value 7 is smaller than the current input pointer value 8.

If unprocessed paths remain, one of the paths is selected (step S14) and it is checked (in step S17 shown in FIG. 8)

whether or not an error pattern in progress is detected on the path. If yes, another error pattern cannot be applied based on the general rule that two or more error patterns cannot be applied in a single analysis path. If the error pattern slot contains an error pattern in progress on the analysis path, then the answer is positive. In this example, root path [0] is selected. However, since this case doesn't contain an error pattern, the determination result is negative.

If there is no error pattern in progress, then it is checked (step S18) whether or not an error is allowed in the current analysis path. At this time, an error condition 14 in the permanent memory 11 is referred to and it is checked whether or not the current analysis path meets the conditions. In this case, only one type of error pattern is allowed for a word containing less than 6 characters based on the error condition 14. Since the error statistics information about the route path [0] is empty, no error pattern has been applied and therefore an error is allowed on the analysis path.

When an error is allowed, an appropriate error pattern id read from the permanent memory 11 and stored in the temporary memory 15 under the above described condition (step S19). In this step, the error patterns [1] and [2] shown in FIG. 5 are stored in the temporary memory 15. Then, it is checked whether or not an unprocessed error pattern still exists (step S20). If yes, one of the patterns is selected (step S21).

Since processed error patterns are removed from the temporary memory 15, the remaining patterns in the temporary memory 15 can be referred to as unprocessed error patterns.

In this process, the error patterns [1] and [2] have just been stored in the temporary memory 15, and are considered to be unprocessed error patterns. Thus, assume that the error pattern [1] is first selected.

Next, it is checked (in step S22) whether or not the selected error pattern is applicable. If the input character applies to the first character of the fault pattern in the error pattern, the error pattern is determined to be applicable. In this process, the fault pattern of the error pattern [1] is (xy), and the first character is a variable x. Since there are no restrictions placed on the variable x, it is determined that the error pattern [1] is applicable. If the selected error pattern is applicable, then a new analysis table, TRIE table, and morpheme derivation can be obtained according to the error patterns (step S23).

FIG. 9 is a flowchart showing the process in step S23 in FIG. 8.

When the process starts as shown in FIG. 9, the processor 20 checks whether or not the correct pattern of the current error pattern is empty (step S31). In this example, the correct pattern of the error pattern [1] is (yx), and is not empty. Therefore, the first position of the correct pattern is referred to, an alternative character (string) is calculated, and the result is written to the temporary memory 15 (step S32). In this case, the first position of the correct pattern (yx) contains another variable y, and the condition is not equal to the value of the variable x (x≠y). However, the variable x is replaced with the input character 'f', and all characters (including alphabetical characters and symbols) other than the character 'f' are allowed as the variable y and are processed as candidates for alternative characters.

Next, an alternative character or one of the alternative character strings written to the temporary memory 15 (step S33) is selected. If it is an alternative character string, the first character is fetched (step S34). Then, it is checked whether or not the alternative character or the first character of the alternative character string corresponds to an entry of the input character of the current TRIE table (step S35). The current TRIE table refers to a TRIE table specified in the last step on the analysis path to be processed. In this case, it corresponds to the TRIE table "root".

In step S33, when the alternative character 'a' is selected, the process in step S34 is omitted and 'a' is compared with the entry of the TRIE table "root" because the character is not an alternative character string (step S35). As the result, 'a' corresponds to an entry of the TRIE table "root".

If the alternative character corresponds to the entry of the current TRIE table, the next corresponding TRIE table is read and the data of the new analysis path is computed in the format shown in FIG. 6A (step S36). In this case, the next TRIE table 'a-' is read from the TRIE table link 'a-' of the TRIE table "root", and the name of the current TRIE table in a step newly added to the root path is 'a-'. The last read character is 'f' read in step S12, and a replacing character is 'a' selected in step S33. The error pattern in progress is (/f/a)⇒(/a/f) obtained by substituting x=f, y=a for the error pattern [1] selected in step S21. Since the first character f of the fault pattern has been read, the final result is (/a)⇒(/f). The condition (x≠y) is insignificant and then removed. As the error pattern [1] has been applied, the number of error 1 and the weight 0.6 of the error pattern [1] is set as error statistics information. The position of the input pointer is shifted in step S12 and the value is 8. Thus, the analysis path [1.1] shown in FIG. 12 is generated.

Then, it is checked whether or not a morpheme has been recognized (step S37). If yes, a morpheme derivation indicating the derivation of the morpheme is generated and written to the temporary memory 15 (step S38). The morpheme derivation is data obtained by combining a morpheme description with an analysis path up to the recognition of the morpheme. A morpheme description specifies a recognized morpheme, and the format of the description can be optionally defined. On the analysis path [1.1] shown in FIG. 12, the input character 'f' is replaced with 'a'. As a result, it is recognized as an article 'a'. Then, for example, the morpheme derivation {1. 1} shown in FIG. 13 is written to the temporary memory 15. The morpheme derivation {1. 1} comprises the morpheme description (a, Art) and the analysis path [1. 1]. The morpheme description (a, Art) indicates that the part-of-speech of the recognized morpheme 'a' is an article.

Then, it is checked whether or not the current alternative character string is empty (step S39). If yes, a new analysis path is written to the temporary memory 15 (step S40). If not, the processes in and after step S34 are repeatedly performed. Since no alternative character string is generated in this case, the analysis path [1. 1] obtained in step S36 is written as a new path to the temporary memory 15.

Then, it is checked whether or not the temporary memory 15 contains another alternative character (string). If yes, the processes in and after step S33 are repeatedly performed. If not, the process shown in FIG. 9 is terminated and the processes in and after step S20 are repeatedly performed.

Since only 'a' is retrieved in this case, a number of alternative characters are left. Therefore, the loop process in steps S33 through S41 and then back to S33 is performed on each alternative character.

If no alternative character is detected as an entry of the TRIE table in step S35, the processes from step S36 through S40 are skipped. If no morpheme is recognized in step S37, the process in step S38 is skipped. For example, 'r' is one of the alternative characters. For the 'r', the analysis path [1. 2] shown in FIG. 12 is generated, but no morpheme is recognized or no morpheme derivation is generated.

As a result, a path is generated for each of the alternative character in the TRIE table entry. The TRIE table in this case is the high order TRIE table "root" and all English characters are contained in the entry. Therefore, the number of generated paths is equal to the number of the alternative characters.

However, in other embodiments, the number of the characters can be limited (for example, to only one character) in filling variables in the correct pattern. In such a case, a specified alternative character can be obtained by checking whether or not the variable is found in the fault pattern, obtaining the position of the variable in the fault pattern, and peeking at the character at the corresponding position in the input character string. As another embodiment, a possible alternative character can be obtained using the current TRIE table. The number of the loop processes can be considerably reduced by preventing a character not entered in the current TRIE table from being written to the temporary memory 15 as an alternative character.

The processor 20 checks whether or not an unprocessed error pattern is left in the temporary memory 15 (step S20 in FIG. 8). Since an error pattern [2] is still left in this case, the pattern is retrieved (step S21) and regarded as being applicable as well as the error pattern [1] (step S22). Since the correct pattern is not empty, an alternative character similar to the error pattern [1. 1] is generated. Similarly, the loop process in steps S33 through S41 and then back to S33 is repeated for the necessary number of performances. However, the generated analysis path is particularly different in error pattern in progress and error statistics information from that for the error pattern [1].

The analysis paths [1. 3] and [1. 4] shown in FIG. 12 are used when the variable y of the error pattern [2] is replaces with 'a' and 'r' respectively. Since the error pattern [2] becomes applicable when it is represented, the slot of the error pattern in progress stores "⋈" indicating that it has been applied.

The slot of the error statistics information stores the weight value 0.4 of the error pattern [2] together with the error number 1.

When all analysis paths relating to the alternative characters for the error pattern [2] are generated, control returns to step S20. However, since the error patterns [1] and [2] read to the temporary memory 15 in step S19 have already been read, no error pattern is left in the temporary memory 15. Therefore, it is checked whether or not there is an error pattern in progress (step S24). This process is the same as that in step S17, and the reason for repeating the process in step S24 is clarified later. Since the error patterns [1] and [2] have already been processed, the determination result is negative.

Although the processor 20 has finished the processes on all error patterns in the temporary memory 15, no process has been performed with the input characters recognized as correct. If there is no error pattern in progress in step S24, the input character is assumed to be correct and a new analysis, TRIE table, and morpheme derivation are obtained (step S25).

FIG. 10 is a flowchart showing the process in step S25 shown in FIG. 8.

In FIG. 10, the processor 20 first checks whether or not the input character is found in the entry of the TRIE table (step S51). In this example, the TRIE table to be processed is the TRIE table "root", and the input character 'f' is detected in the entry.

Next, it is checked (step S53) whether or not a morpheme has been recognized by reading the next corresponding TRIE table from the permanent memory 11, calculating a new analysis path, and writing the result to the temporary memory 15 (step S52). If the morpheme has been recognized, then the morpheme derivation is written to the temporary memory 15 (step S54), the process in FIG. 10 is terminated, and the process in step S13 shown in FIG. 7 is performed. In this example, it is assumed that the input character 'f' is correct, the TRIE table 'f' is read, and the analysis path [1. 5] shown in FIG. 12 is generated. However, only the character 'f' cannot be recognized as a corresponding dictionary word (no in step S53), and therefore the process in step S54 is skipped.

Next, it is checked whether or not an unprocessed analysis path is left (step S13 in FIG. 7). An unprocessed analysis path refers to an analysis path having a value smaller than that of an actual input pointer as described above. The root path cannot be detected because it has already been read from the temporary memory 15 in the first process in step S14. Instead, all newly generated paths such as analysis paths [1. 1] through [1. 5] are left. However, all the paths do not correspond to unprocessed analysis paths because the paths have an input pointer value of 8, that is, the value of the current input pointer.

Then, it is checked whether or not an active path is left (step S15). All generated analysis paths are contained in the temporary memory 15 and is determined to be active. The analysis paths [1. 1], [1. 2], [1. 3], [1. 4], and [1. 5] shown in FIG. 12 are only a part of the generated analysis paths. Actually, a number of analysis paths are generated corresponding to a number of alternative characters.

If active paths are left, the next input character (leftmost character of the remaining input character string) is read (step S12) and the process performed on the first input character is performed again. In this example, the next input character 'r' is read from the position 8 as an input pointer value, and the input pointer is shifted to 9. Thus, all analysis paths in the temporary memory 15 become unprocessed analysis paths, and one of the paths is selected. Assuming that the analysis path [1. 1] has been selected, the determination result in step S17 is positive because the path contains the error pattern (/a)⇒(/f) in progress. As a result, it is checked whether or not the error pattern is applicable on the analysis path [1. 1] (step S22).

Since the first character 'a' in the fault pattern of the error pattern is different from the input character 'r', the determination result is negative, and it is checked whether or not an unprocessed error pattern is left (step S20). However, after the input character 'r' has been read, no unprocessed error pattern is detected because an error pattern has not been read from the permanent memory 11 to the temporary memory 15, and then it is checked whether or not there is any error pattern in progress (step S24). At this time, a slot of the error pattern on the analysis path [1. 1] is referred to again to know that there is an error pattern in progress. Thus, the process in step S25 is skipped, and the analysis path [1. 1] has failed in generating a new path and is discarded.

In step S17, it is checked whether or not there is an error pattern in progress only by referring to, not by applying to, the error pattern of the analysis path. If the error pattern is not applied, the above described check is made in step S24 to skip generating a new path. Therefore, the same check is made in steps S17 and S24.

Next, control is returned to the process in step S13 in FIG. 7. There are still a number of analysis paths in the temporary memory 15. Assume that the analysis path [1. 2] has been selected (step S14). At this time, control is returned from step S17 to step S22. In this case, since the first character in the fault pattern of the error pattern is an 'r' and matches the 'r' of the input character 'r', control is passed to the process in step S31 shown in FIG. 9, and the process in step S32 is performed. In the case of the error pattern (/r)⇒(/f), a possible alternative character is only an 'f', it is written to the temporary memory 15 (step S32) and then fetched (step S34).

In step S35, the 'f' is compared with the TRIE table "r-" of the analysis path [1. 2]. However, since no English words start with 'rf', the character 'f' does not exist in the entry of the input character of the TRIE table "r-" shown in FIG. 1B. Then, control is passed to the process in step S41. Since no alternative character is detected, control is further passed to the process in step S20. As in the analysis path [1. 1], control is returned from step S24 to step S13.

The analysis path for another alternative character generated from the error pattern [1] is also discarded as in the case of the analysis path [1. 1]. Therefore, as a result of reading the second input character, all analysis paths generated from the error pattern [1] have failed.

Then, the processor 20 processes the analysis path generated from the error pattern [2]. When the analysis path [1. 3] is fetched (step 514), the slot of the error pattern in progress indicates a symbol of having been applied (no in step S17), and then the process in step S18 is performed. At this time, the error condition 14 in the permanent memory 11 is referred to, and only one error is allowed in a word of less than 6 characters. According to the error statistics information about the analysis path [1. 3], an error has already arisen and another error is not allowed, thereby passing control to the next step S25.

In step S25, the input character 'r' is compared with an entry of the TRIE table "a-" shown in FIG. 17A (step S51). Since the 'r' matches one of the entries of the TRIE table "a-", the next corresponding TRIE table "ar-" is read as shown in FIG. 17B, and a new analysis path [2. 1] shown in FIG. 14 is written to the temporary memory 15 (step S52). However, no morpheme is recognized at this point, control is returned to the process in step S13.

When the analysis path [1. 4] is retrieved (step S14), the processes are sequentially performed in order of steps S17, S18, and S51 as in the case of [1. 3]. Since the input character 'r' is not found in the entry of the TRIE table "r-" shown in FIG. 1B, control is returned to the process in step S13. Actually, no English word starts with "rr-".

Assume that the analysis path [1. 5] has been retrieved (step S14).

Since no error pattern is in progress (no in step S17) and error statistics information is empty (yes in step S18), the error pattern [1] and [2] are read from the permanent memory 11 to the temporary memory 15 (step S19). Through step S20, for example, the error pattern [1] is selected (step S21). Afterwards, basically as in the process performed on the first character 'f', the loop process in steps S33 through S41 and then back to step S33 is repeatedly performed for the necessary number of times to generate a new analysis path. The analysis paths [2. 2] and [2. 3] shown in FIG. 14 give examples of the paths generated then.

Then, the error pattern [2] is selected (step S21), and the similar process is performed on the pattern to generate a plurality of paths including the analysis path [2. 4]. Afterwards, control is passed from step S20 to step S24 to generate the analysis path [2. 5] in step S25. Then, the processes are performed in order of steps S53, S13, and S15, and the next input character is read (step S12).

The subsequent processes are likewise performed and a number of new analysis paths are generated. The analysis path [3. 1] shown in FIG. 15 is one of the paths generated from the analysis path [2. 5] when the input character 'o' is read. The analysis paths [4. 1], [4. 2], [4. 3], and [4. 4] shown in FIG. 16 are examples of the paths generated when the input character 'm' is read. FIG. 17C shows the TRIE table "aro-" accessed through the analysis path [2.1] when the input character 'o' is read. FIG. 17D shows the TRIE table "arom-" accessed when the next input character 'm' is read. FIG. 17D shows the TRIE table "from-" contained in the last step of the analysis path [4. 1].

Finally the input character string "from" is followed by a "space". Since a "space" is not detected in the input character of the TRIE table (no in step S51), all the analysis paths except the path [4. 1] fail in generating a new path. There is freedom of recognizing a "space" as a misspelling because no error pattern has been applied yet. Therefore, other alternative characters can be generated, but no new path is generated from any alternative character because the entry of the TRIE table "from-" is empty (no in step S35). That is, when a space is read, a new path cannot be successfully generated for all analysis paths.

It is determined that no active path is left (step S15), and an output is calculated using the morpheme derivation written to the temporary memory 15 in steps S38 and S54 (step S16).

In calculating the output, the processor 20 first stores the generated morpheme derivation in order from the highest possibility as a recognized word. The possibility as a recognized word can be calculated using the error statistics information, that is, one of the characteristics of the analysis paths contained in the morpheme derivation, and using the length of the morpheme itself described in the morpheme description. Different paths described with the same morpheme description refer to the process for preventing duplicate processes. As a result, the most possible word is left. Then, the morpheme derivation that is not processed using an error pattern is removed.

For example, in the morpheme derivation {1. 1} shown in FIG. 13, the error pattern [1] is being partly applied, and it is not valid as an output as long as the left fault pattern and correct pattern are not processed. Accordingly, such a morpheme derivation is discarded.

In another embodiment, if a spelling error spans two adjacent words, an incomplete error pattern is used to recognize the subsequent input character strings. The remaining morpheme derivation is output after being converted into an appropriate format applicable for the next process such as a syntax process, etc.

The final outputs in the first embodiment are character strings "from", "form", "prom", "frog", and shorter character strings "a", "fro", and "for". They are recognized as candidates for a morpheme. Among the character strings, the analysis paths corresponding to the "from", "form", "prom", and "frog" are [4. 1], [4. 2], [4. 3], and [4. 4] shown in FIG. 16. The analysis paths corresponding to "a" and "fro" are [1. 3] in FIG. 12 and [3. 1] in FIG. 15 respectively. The "fro" is normally used to represent "to and fro". The character strings "a", "fro", and "for" shorter than the above listed other character strings indicate that another processor is required to perform the optimum process by selecting these shorter character strings from the output of the system according to the present invention.

According to the above described first embodiment, the fault pattern of an error pattern is equal in length to the correct pattern. That is, a new step is generated and a new TRIE table is referred to each time an input character is read. However, the processes are not always performed in this procedure.

The second embodiment is described below by referring to FIGS. 7 through 10, and FIGS. 18A through 21E.

According to the second embodiment, the error patterns [4] and [5] are adopted.

The error pattern [4] describes the case where a character is doubled, as for instance the 'n' in "venneer". In this case, the correct spelling is "veneer".

The error pattern [5] has two conditions. The condition "(x⇌y)" indicates that the variables x and y are adjacent to each other on the keyboard. The condition (x≠y) indicates that the characters respectively corresponding to the variables x and y are different from each other. For example, the alphabetical characters 'q', 'w', and 'e' are respectively adjacent to 'w', 'e', and 'r', but 'q' is not adjacent to 'e'.

That is, the error pattern [5] describes the case where the character that corresponds to the variable y and is adjacent to the character corresponding to the variable x should come before the character corresponding to the variable x, but actually has been omitted. Such misspellings are often found. For example, "veneer" may be misspelled "vener".

Figure 18A:
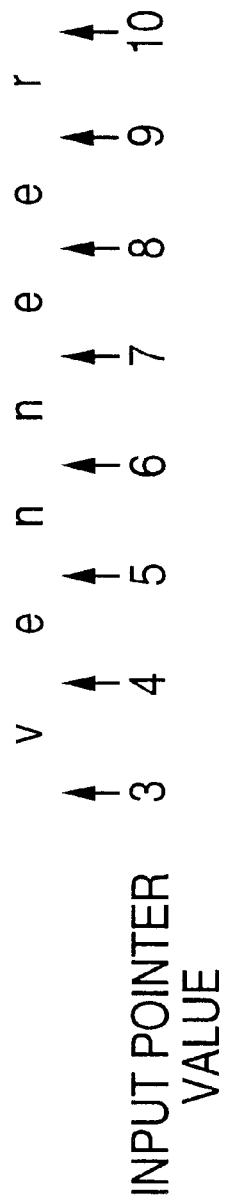
FIGS. 18A and 18B show input character strings according to the second embodiment.
Figure 18B:
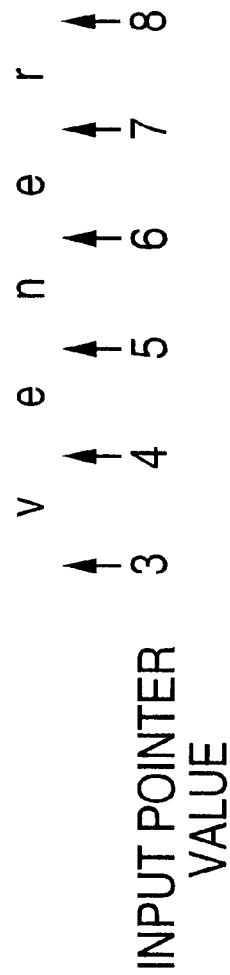

Described below are the case where the correct pattern is shorter than the fault pattern in the error pattern [4] (refer to FIG. 18A) and the case where the correct pattern is longer than the fault pattern in the error pattern [5] (refer to FIG. 18B).

Described first is the process performed using the error pattern [4]. FIG. 18A shows the relationship between the input character string "venneer" and the input pointer value.

Assume that the input characters 'v' and 'e' have been processed and the analysis path [2. 6] shown in FIG. 19 has been obtained. If the character 'n' is read in step S12 as shown in FIG. 7, the analysis path [2. 6] is selected (step S14) and the error pattern [4] is selected (step S21). Since the first character of the fault pattern in the error pattern [4] is a variable and is not limited by specific conditions, this error pattern is applied to the character (yes in step S22). The correct pattern is not empty (no in step S31) and an alternative character is computed (step S32). In this case, the only possible alternative character is 'n'.

Then, the alternative character 'n' is selected (step S33) and compared with the entry of the TRIE table "ve-" shown in FIG. 21A (step S35). Since the 'n' is contained in the entry of the TRIE table "ve-", the analysis path [3. 3] shown in FIG. 19 is newly generated. However, no morpheme is recognized (no in step S37) and the alternative character string is empty (yes in step S39). Accordingly, only the generated analysis path [3. 3] is written to the temporary memory 15 (step S40). Since no alternative characters exist (no in step S41), control is returned to the process in step S20.

Assume that, in order of the processes, the second 'n' of the input character string is read and the analysis path [3. 3] has been selected. Since the error pattern in progress exists on the analysis path (yes in step S17), control is immediately passed to the process in step S22. Since the fault pattern in the error pattern is (/n) and matches the input character 'n', the error pattern is applied (yes in step 22). The correct pattern is empty (yes in step S31), control is passed to the process in step S42, and a new analysis path is calculated. At this time, the analysis path [4. 5] shown in FIG. 19 is generated.

The interesting point is that the TRIE table "ven" in the added step is the same as the TRIE table in the precedent table. This is necessary and desired to ignore the second 'n' in the input character string. The TRIE table "ven-" is shown in FIG. 21B. Then, the analysis path [4. 5] is written to the temporary memory 15 (step S40). Since no alternative characters exist (no in step S41), the process is performed in order of steps S20, S24, and S13. Assuming that the remaining input character string "eer" is correct, the morpheme "veneer" is finally recognized (yes in step S53) and the corresponding morpheme derivation can be obtained (step S54). In this example, the analysis is successfully performed using the error pattern in which the correct pattern is shorter than the fault pattern.

Another possibility is that the correct pattern is longer than the fault pattern in the error pattern [5]. FIG. 18B shows the relationship between the input character string "vener" and the input pointer value.

Assume that 'r' at the position of the input pointer value 7 is read (step S12), the analysis path [4. 6] is selected (step S14), and the error pattern [5] is selected (step S21). Since the fault pattern of the error pattern [5] begins with the variable x, this error pattern is applied (yes in step S22) and the variable x is replaced with the character 'r'.

Since the correct pattern is not empty (no in step S31), the alternative character or alternative character string is computed (step S32). The error pattern apparently indicates which should be computed, the alternative character or the alternative character string. If the length of the fault pattern is 1 and the correct pattern is longer than 1, then the processor 20 recognizes that the alternative character string should be generated instead of the alternative character. In this example, the length of the fault pattern is 1 and the length of the correct pattern is 2. Therefore, the alternative character string is generated. The correct pattern indicates that the alternative character string should be a character string applicable to the variable string yx. However, since the variable x has already been replaced with the character 'r', a candidate for the variable y is computed. Next, the condition indicates that the character applicable to the variable y should be adjacent to the character 'r' on the keyboard. Accordingly, the characters 'e' and 't' are candidates. Thus, the alternative character strings "er" and "tr" are generated.

Figure 20:
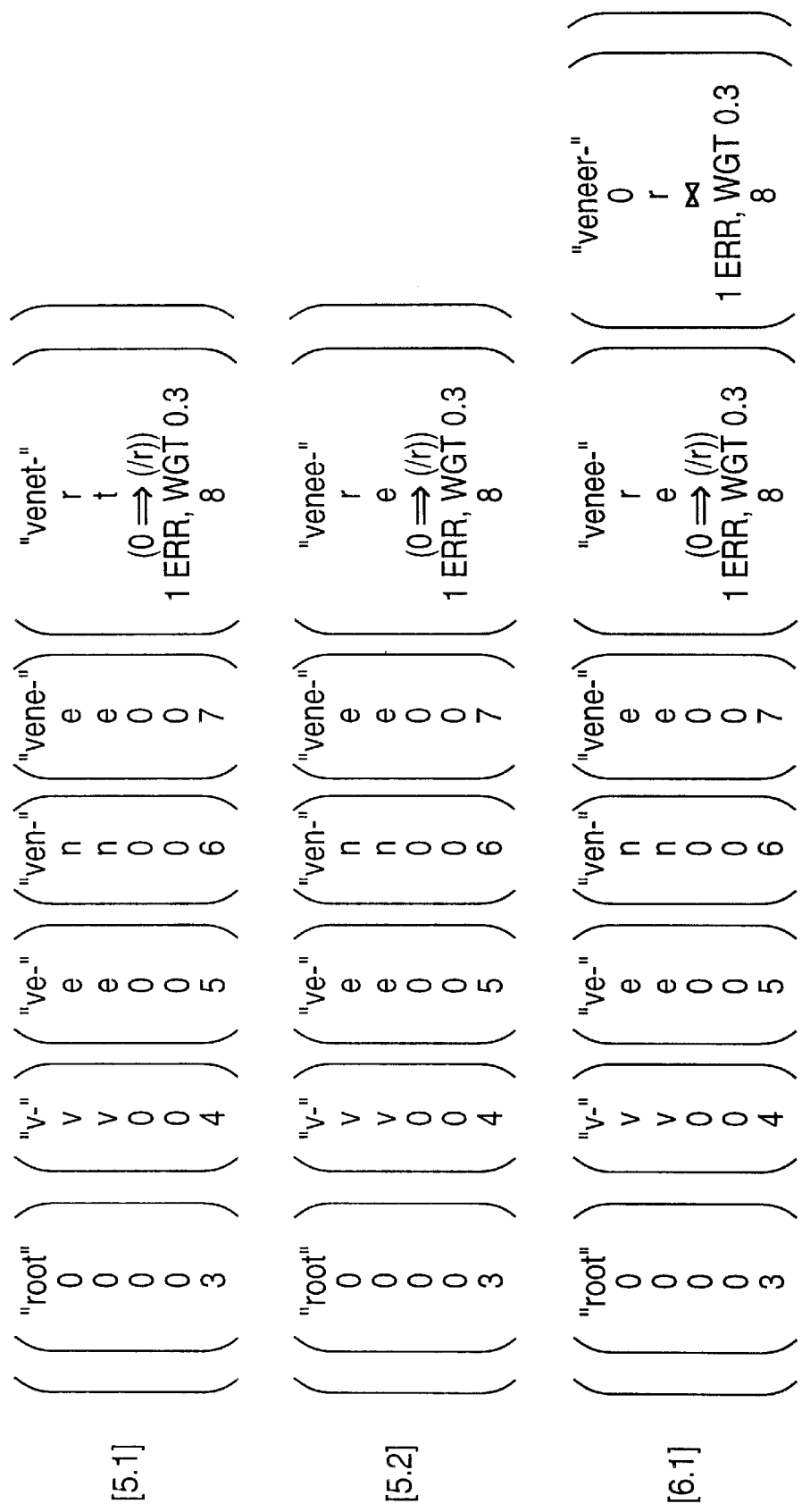
FIG. 20 shows the analysis path (2) according to the second embodiment.

Next, one of the alternative character strings, for example, "tr" is selected (step S33), and the first character "t" is retrieved (step S34) and compared with the entry of the TRIE table "vene-" shown in FIG. 21C (step S35). Since the character 't' is the entry of the TRIE table "vene-", the next TRIE table "venet-" shown in FIG. 21E is read and the analysis path [5. 1] shown in FIG. 20 is newly generated. Since no morpheme is recognized (no in step S37), the process in step S38 is skipped. The character 'r' remains in the alternative character string, indicating that the string is not empty (no in step S39). The first character 'r' remaining in the alternative character string is retrieved (step S34), but the character is not applicable to the TRIE table "venet-" (no in step S35). Then, control is passed to the process in step S41. The intermediate analysis path [5. 1] generated in processing the first character 't' of the alternative character string "tr" is not written to the temporary memory 15.

Since another alternative character string "er" remains in the temporary memory 15, the alternative character string is selected (step S33), and the first character 'e' is retrieved (step S34) and compared with the entry of the TRIE table "vene-" (step S35). Since the character 'e' is also found in the entry of the TRIE table "vene-", the next TRIE table "venee-" shown in FIG. 21D is read, and the analysis path [5. 2] is newly generated. However, since no morpheme is recognized (no in step S37) and the alternative character string is not empty (no in step S39), the character 'r' is retrieved from the remaining alternative character string (step S34). Since the character is found in the entry of the TRIE table "venee-" (yes in step S35), the next TRIE table "veneer-" (not shown in the attached drawings) is read and a new analysis path [6. 1] is generated.

The morpheme "veneer" is recognized (yes in step S37) and the morpheme derivation and analysis path [6. 1] are written to the temporary memory 15 (steps S38 and S40). As with the morpheme derivation {1. 1} shown in FIG. 13, the written morpheme derivation comprises the morpheme description of the word "veneer" and analysis path [6. 1]. Since no alternative character strings are left behind (no in step S41), control is returned to the process in step S20. Thus, an analysis may be successfully performed using an error pattern with the correct pattern being longer than the fault pattern.

According to the above described first and second embodiments, the error condition stored in the permanent memory 11 is that only one error is allowed in a word of less than 6 characters. The condition can be described using the weight value of each error pattern. For example, a new error pattern can be applied by sequentially adding the weight value to the error statistics information as long as the sum does not exceed a predetermined threshold each time an error pattern is applied.

According to the above described embodiment, English character strings are input. However, the present invention is not limited to a specified language, but can be used for the character strings and symbol strings written in Japanese, Chinese, German, Dutch, etc. Furthermore, the input character strings do not have to be written in a single language, but can be written in a plurality of languages entered in the dictionary.

Additionally, the character string can be input in any format, for example, a character string input through an optical reader such as a scanner and a voice-input character string can be processed by the character string correction system according to the present invention.

According to the present invention as described above in detail, the information processing system for performing a morphological analysis proceeds with the process under the assumption that an error in the input character string belongs to a specific pattern, thereby efficiently correcting input character strings containing errors. Therefore, the process time can be considerably reduced in specifying the character string obtained as a recognition result for an input character string.

What is claimed is:

1. A character string correction system for use in an information processing system for analyzing a morpheme by comparing an input character string with a dictionary entry, comprising:

dictionary storage means for storing a dictionary having entries of input characters to be compared with characters in the input character string;

error pattern storage means for storing an error pattern prescribing a type of possible error in the input character string and for storing the error pattern comprising a fault pattern representing a character pattern of a possible error and a correct pattern representing a correct character pattern corresponding to the fault pattern; and retrieval means for searching the dictionary stored in said dictionary storage means using the error pattern stored in said error pattern storage means retrieving the dictionary entry corresponding to the input character string, outputting the retrieved dictionary entry as a candidate for a recognized word, generating an alternative character replacing a first character by referring to the correct pattern when the first character corresponding to the fault pattern is input, and searching the dictionary using the alternative character.

2. The character string correction system according to claim 1, wherein said retrieval means generates an alternative character string replacing the first character by referring to the correct pattern, and searches the dictionary using each character in the alternative character string as the alternative character.

3. The character string correction system according to claim 1, wherein said retrieval means searches the dictionary using the alternative character under assumptions that a second character in the input character string is a beginning of the fault pattern even when the second character matches an entry of the input character in the dictionary.

4. The character string correction system according to claim 1, wherein said retrieval means generates a plurality of alternative characters corresponding to the correct pattern, searches the dictionary using each alternative character, and retrieves the alternative character to obtain a candidate for the recognized word from among the plurality of alternative characters.

5. The character string correction system according to claim 1, wherein said retrieval means selects the alternative character matching the input character string from among the plurality of alternative characters corresponding to the correct pattern by reading remaining characters in the input character string, and searches the dictionary using the selected alternative character.

6. The character string correction system according to claim 1, wherein said retrieval means determines whether or not the error pattern matches the input character string by reading remaining characters in the input character string and comparing the characters with the plurality of alternative characters corresponding to the correct pattern.

7. The character string correction system for use in an information processing system for analyzing a morpheme by comparing an input character string with a dictionary entry, comprising:

dictionary storage means for storing a dictionary having a entries of input characters to be compared with characters in the input character string;

said dictionary storage means stores the dictionary containing a plurality of TRIE tables for use in retrieving each input character;

each of said plurality of TRIE tables comprises a character entry and a TRIE table link, corresponding to a character string from a first character to an intermediate character in a dictionary entry, wherein said character entry of the input character indicating a candidate for a next character, and wherein said TRIE table link specifying a next TRIE table;

a corresponding word entry in a dictionary representing a correspondence to the dictionary entry;

error pattern storage means for storing an error pattern having a type of possible error in the input character string, conditions and a weight comprising:

a fault pattern representing a character pattern of a possible error and a correct pattern representing a correct character pattern corresponding to the fault pattern; and retrieval means for searching the dictionary stored in said dictionary storage means using the error pattern storage means retrieving the dictionary entry corresponding to the input character string, and outputting the retrieved dictionary entry as a candidate for a recognized word; wherein said retrieval means compares an alternative character obtained from the correct pattern with the character entry of the input character to retrieve the plurality of TRIE tables.

8. A character string correction system for use in an information processing system for analyzing a morpheme by comparing an input character string with a dictionary entry, comprising:

dictionary storage means for storing a dictionary having entries of input characters to be compared with characters in the input character string;

error pattern storage means for storing an error pattern prescribing a type of possible error in the input character string;

retrieval means for searching the dictionary stored in said dictionary storage means using the error pattern stored in said error pattern storage means retrieving the dictionary entry corresponding to the input character string, outputting the retrieved dictionary entry as a candidate for a recognized word, and for generating a corresponding analysis path when a character in the input character string matches an entry of the input character in the dictionary; and memory means for storing an analysis path indicating a retrieval path from a first character to an intermediate character of the dictionary entry.

9. The character string correction system according to claim 8, wherein said retrieval means generates the analysis path including information about an error pattern in progress when said error pattern is applied to said input character string.

10. The character string correction system according to claim 8, wherein when recognizing a morpheme as a result of searching the dictionary, said retrieval means stores information specifying the morpheme as being associated with the analysis path.

\* \* \* \* \*